US011447603B2

(12) United States Patent
Lee et al.

(10) Patent No.: US 11,447,603 B2
(45) Date of Patent: *Sep. 20, 2022

(54) POLYESTER RESIN, METHOD FOR PREPARING SAME, AND RESIN MOLDED PRODUCT FORMED THEREFROM

(71) Applicant: SK CHEMICALS CO., LTD., Gyeonggi-do (KR)

(72) Inventors: Yoo Jin Lee, Gyeonggi-do (KR); Sung-Gi Kim, Gyeonggi-do (KR); Boo-Youn Lee, Gyeonggi-do (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/615,500

(22) PCT Filed: May 29, 2018

(86) PCT No.: PCT/KR2018/006111
§ 371 (c)(1),
(2) Date: Nov. 21, 2019

(87) PCT Pub. No.: WO2018/221944
PCT Pub. Date: Dec. 6, 2018

(65) Prior Publication Data
US 2020/0087450 A1    Mar. 19, 2020

(30) Foreign Application Priority Data

May 31, 2017  (KR) .................. 10-2017-0067962

(51) Int. Cl.
*C08G 63/672* (2006.01)
*C08G 63/78* (2006.01)

(52) U.S. Cl.
CPC ........... *C08G 63/672* (2013.01); *C08G 63/78* (2013.01)

(58) Field of Classification Search
CPC .............................. C08G 63/672; C08G 63/78
USPC ........................................................ 428/213
See application file for complete search history.

(56) References Cited

U.S. PATENT DOCUMENTS

| 4,060,516 A | 11/1977 | Kuratsuji et al. |
| 5,521,278 A | 5/1996 | O'Brien et al. |
| 5,959,066 A | 9/1999 | Charbonneau et al. |
| 6,025,061 A | 2/2000 | Khanarian et al. |
| 6,063,464 A * | 5/2000 | Charbonneau ....... C08G 63/668 428/36.92 |
| 6,063,465 A | 5/2000 | Charbonneau et al. |
| 6,063,495 A * | 5/2000 | Charbonneau ............. D01F 6/86 428/364 |
| 6,126,992 A * | 10/2000 | Khanarian ........... G11B 7/2535 427/162 |
| 6,140,422 A * | 10/2000 | Khanarian ............ C08L 67/025 525/176 |
| 6,359,070 B1 | 3/2002 | Khanarian et al. |
| 6,699,546 B2 | 3/2004 | Tseng |
| 2003/0232959 A1 | 12/2003 | Adelman et al. |
| 2004/0092703 A1 | 5/2004 | Germroth et al. |
| 2007/0059465 A1 | 3/2007 | Thompson et al. |
| 2011/0214720 A1 | 9/2011 | Hashimoto et al. |
| 2012/0040167 A1 | 2/2012 | Kim et al. |
| 2012/0177854 A1 | 7/2012 | Lee et al. |
| 2012/0207993 A1 | 8/2012 | Joo et al. |
| 2013/0295306 A1 * | 11/2013 | Kim .................. C08G 63/6886 428/35.7 |
| 2013/0319525 A1 | 12/2013 | Nakai |
| 2014/0011976 A1 * | 1/2014 | Kim ...................... C08G 63/60 528/302 |
| 2015/0087789 A1 | 3/2015 | Utsunomiya et al. |
| 2016/0130415 A1 * | 5/2016 | Miyasaka .................. C08J 5/18 428/355 N |
| 2016/0185510 A1 | 6/2016 | Degroote et al. |
| 2016/0222157 A1 | 8/2016 | Lee et al. |
| 2017/0136747 A1 | 5/2017 | Torradas |
| 2017/0144420 A1 * | 5/2017 | Lim .................... C09D 167/02 |
| 2017/0166746 A1 | 6/2017 | Maeda et al. |
| 2018/0155493 A1 * | 6/2018 | Jacquel ................. C08G 63/80 |
| 2020/0148816 A1 | 5/2020 | Lee et al. |
| 2020/0173060 A1 | 6/2020 | Lee et al. |

FOREIGN PATENT DOCUMENTS

| CA | 2940858 A1 * | 10/2015 | ........... C09D 167/02 |
| CN | 1298343 | 6/2001 | |
| CN | 1298346 | 6/2001 | |
| CN | 1298416 | 6/2001 | |
| CN | 1298426 | 6/2001 | |
| CN | 1298461 | 6/2001 | |
| CN | 1711302 | 12/2005 | |

(Continued)

OTHER PUBLICATIONS

Machine_English_translation_KR_20170037588_A; 14-Polyester resin copolymerized with isosorbide and 14-cyclohexane dimethanol and preparing method thereof; Apr. 3, 2017; EPO; whole document (Year: 2017).*

(Continued)

*Primary Examiner* — Tahseen Khan
(74) *Attorney, Agent, or Firm* — Sheridan Ross P.C.

(57) ABSTRACT

The present invention relates to a polyester resin. The polyester resin contains a particular content of diol moieties, derived from isosorbide and diethylene glycol, and thus can provide a resin molded product exhibiting high transparency in spite of a large wall thickness thereof.

9 Claims, No Drawings

(56) References Cited

FOREIGN PATENT DOCUMENTS

| | | | | |
|---|---|---|---|---|
| CN | 102498150 | 6/2012 | | |
| CN | 105392816 | 3/2016 | | |
| EP | 2857433 | 4/2015 | | |
| EP | 3395855 | 10/2018 | | |
| EP | 3441414 | 2/2019 | | |
| FR | 3036400 A1 * | 11/2016 | ............ | C08G 63/80 |
| JP | S50-14818 | 2/1975 | | |
| JP | S50-18722 | 2/1975 | | |
| JP | H11-323658 | 11/1999 | | |
| JP | 2002-512304 | 4/2002 | | |
| JP | 2002-512315 | 4/2002 | | |
| JP | 2006-070101 | 3/2006 | | |
| JP | 2006-214057 | 8/2006 | | |
| JP | 2010-215770 | 9/2010 | | |
| JP | 2012-126821 | 7/2012 | | |
| JP | 2013-047317 | 3/2013 | | |
| JP | 5752617 | 7/2015 | | |
| JP | 5903980 | 4/2016 | | |
| JP | 2016-529171 | 9/2016 | | |
| KR | 10-2001-0034803 | 4/2001 | | |
| KR | 10-2001-0034804 | 4/2001 | | |
| KR | 10-2001-0034807 | 4/2001 | | |
| KR | 10-2001-0034808 | 4/2001 | | |
| KR | 10-2001-0034809 | 4/2001 | | |
| KR | 10-0504063 | 7/2005 | | |
| KR | 10-2006-0007447 | 1/2006 | | |
| KR | 10-2010-0113769 | 10/2010 | | |
| KR | 10-2011-0039185 | 4/2011 | | |
| KR | 10-2012-0072484 | 7/2012 | | |
| KR | 10-2015-0062234 | 6/2015 | | |
| KR | 10-2015-0077993 | 7/2015 | | |
| KR | 10-2016-0037940 | 4/2016 | | |
| KR | 10-2016-0083399 | 7/2016 | | |
| KR | 20170037588 A * | 4/2017 | | |
| TW | 201615742 | 5/2016 | | |
| TW | 201700529 | 1/2017 | | |
| TW | 201713707 | 4/2017 | | |
| WO | WO 99/54119 | 10/1999 | | |
| WO | WO 2012-105770 | 8/2012 | | |
| WO | WO 2016/125860 | 8/2016 | | |

OTHER PUBLICATIONS

International Search Report and Written Opinion for International (PCT) Patent Application No. PCT/KR2018/006111, dated Sep. 6, 2018, 13 pages.

Translated International Search Report for International (PCT) Patent Application No. PCT/KR2018/006111, dated Sep. 6, 2018, 3 pages.

Extended Search Report for European Patent Application No. 18809897.4, dated Dec. 9, 2020, 7 pages.

International Search Report and Written Opinion for International (PCT) Patent Application No. PCT/KR2018/006858, dated Nov. 29, 2018, 12 pages.

Official Action for U.S. Appl. No. 16/624,148, dated Oct. 14, 2020 10 pages.

International Search Report and Written Opinion for International (PCT) Patent Application No. PCT/KR2018/006322, dated Sep. 10, 2018, 11 pages.

Translated International Search Report for International (PCT) Patent Application No. PCT/KR2018/006322, dated Sep. 10, 2018, 2 pages.

International Search Report for International (PCT) Patent Application No. PCT/KR2018/007177, dated Oct. 2, 2018, 2 pages.

International Search Report and Written Opinion for International (PCT) Patent Application No. PCT/KR2018/007177, dated Oct. 2, 2018, 10 pages.

Official Action for U.S. Appl. No. 16/625,114, dated Oct. 13, 2020 11 pages.

Official Action for U.S. Appl. No. 16/616,078, dated Oct. 20, 2020 12 pages.

Extended Search Report for European Patent Application No. 18819852.7, dated Mar. 11, 2021, 9 pages.

Official Action for U.S. Appl. No. 16/624,148, dated Mar. 23, 2021 10 pages.

Official Action for U.S. Appl. No. 16/615,078, dated Apr. 21, 2021 14 pages.

Official Action for U.S. Appl. No. 16/625,114, dated Mar. 23, 2021 13 pages.

Official Action for U.S. Appl. No. 16/625,114, dated Aug. 25, 2021 10 pages.

Official Action for U.S. Appl. No. 16/624,148, dated Aug. 24, 2021 11 pages.

Official Action for U.S. Appl. No. 16/616,078, dated Aug. 27, 2021 11 pages.

Notice of Allowance for U.S. Appl. No. 16/625,114, dated Mar. 1, 2022 8 pages.

Official Action for U.S. Appl. No. 16/624,148, dated Jan. 27, 2022 8 pages.

Official Action for U.S. Appl. No. 16/624,148, dated Jul. 6, 2022 9 pages.

\* cited by examiner

POLYESTER RESIN, METHOD FOR PREPARING SAME, AND RESIN MOLDED PRODUCT FORMED THEREFROM

CROSS-REFERENCE TO RELATED APPLICATION(S)

This application is a national stage application user 35 U.S.C. 371 and claims the benefit of PCT Application No. PCT/KR2018/06111 having an international filing date of 29 May 2018, which designated the United States, which PCT application claimed the benefit of Korean Patent Application No. 10-2017-0067962 filed on May 31, 2017 with the Korean Intellectual Property Office, the disclosure of which is incorporated herein by reference in its entirety.

TECHNICAL FIELD

The present invention relates to a polyester resin capable of providing a resin molded article exhibiting high transparency despite its thick thickness, a method for preparing the same, and a resin molded article formed therefrom.

BACKGROUND

PET (polyethylene terephthalate) represented by a polyester resin is widely used for commercial purposes due to its low price and excellent physical/chemical properties. However, it has high crystallinity and thus requires a high temperature during processing, and there is a problem that transparency of a molded article is lowered. In addition, the PET has poor heat resistance and so cause a problem that the shape of a bottle molded with PET is deformed during high temperature filling of a beverage. In order to prevent this, an attempt is made to increase the heat resistance of the bottle through a bottleneck crystallization process and a heat setting process before and after the bottle formation, but the transparency of the bottle is decreased.

In order to overcome these problems, techniques have been developed to increase the glass transition temperature of PET by copolymerizing various monomers.

Among them, isosorbide is a vegetable raw material, can increase the glass transition temperature and improve the mechanical strength after the solid phase polymerization. Due to these advantages, isosorbide has attracted attention as a comonomer applicable to PET.

However, as the content of isosorbide is higher to increase the heat resistance, the regularity of the polymer chains is lowered and the crystallization rate is decreased. Further, when the added amount of isosorbide exceeds a certain level, it cannot function as a crystalline resin. Since the non-crystalline resin cannot be drawn, in order to form the non-crystalline resin into a bottle, it is necessary to design the length of a preform to be similar to the length of the bottle. As a result, it becomes impossible to use the equipment for processing the existing PET resin, and there is a great obstacle in actually manufacturing a resin molded article by using a copolymer using isosorbide.

Technical Problem

The present invention provides a polyester resin and a method for preparing the same.

The present invention provides a resin molded article formed from the polyester resin and exhibiting high transparency even if it is prepared with a thick thickness.

Technical Solution

In order to achieve the objects above, according to one embodiment of the present invention, there is provided a polyester resin polymerized with a dicarboxylic acid including terephthalic acid or a derivative thereof and a diol including isosorbide and ethylene glycol, thereby having an alternating structure of an acid moiety derived from the dicarboxylic acid or a derivative thereof and a diol moiety derived from the diol, wherein the polyester resin includes 6 to 12 mol % of a diol moiety derived from isosorbide and 2 to 5 mol % of a diol moiety derived from diethylene glycol based on the total diol moieties derived from the diol, wherein a melting point exists during the first scan through a differential scanning calorimetry (DSC), and wherein a haze is less than 3% as measured according to ASTM D1003-97 for a specimen having a thickness of 6 mm obtained from the polyester resin.

According to another embodiment of the present invention, there is provided a preparation method of the polyester resin and a molded article prepared from the polyester resin.

Advantageous Effects

The polyester resin according to one embodiment of the present invention has a melting point during the first scan through DSC and so can be formed by drawing. The polyester resin is prepared with a specimen having a thickness of 6 mm and exhibits a haze of less than 3%, thereby enabling the provision of a transparent resin molded article even while having a thick thickness. Therefore, the polyester resin can provide a resin molded article suitable for various uses such as a hot fill jar and a high-pressure vessel.

DETAILED DESCRIPTION OF THE EMBODIMENTS

Hereinafter, a polyester resin, a preparation method thereof, and a resin molded article prepared therefrom according to specific embodiments of the invention will be described.

Unless otherwise specified, the terminology used herein is for the purpose of describing particular embodiments only and is not intended to limit the scope of the invention. Further, the singular forms "a," "an" and "the" are intended to include the plural forms as well, unless the context clearly indicates otherwise. In addition, it will be further understood that the meaning of the terms "comprise", "include" as used herein is intended to specify the presence of stated features, ranges, integers, steps, operations, elements and/or components, but does not preclude the presence or addition of other features, ranges, integers, steps, operations, elements and/or components.

According to one embodiment of the present invention, there is provided a polyester resin polymerized with a dicarboxylic acid including terephthalic acid or a derivative thereof and a diol including isosorbide and ethylene glycol, thereby having an alternating structure of an acid moiety derived from the dicarboxylic acid or a derivative thereof and a diol moiety derived from the diol, wherein the polyester resin includes 6 to 12 mol % of a diol moiety derived from isosorbide and 2 to 5 mol % of a diol moiety derived from diethylene glycol based on the total diol moieties derived from the diol, wherein a melting point exists during the first scan through a differential scanning calorimetry (DSC), and wherein a haze is less than 3% as measured according to ASTM D1003-97 for a specimen having a thickness of 6 mm obtained from the polyester resin.

In the case of PET which is represented by a polyester resin, the regularity of the polymer chain is high and a crystal is formed, whereby a melting point exists during the first scan through DSC. However, since PET has a low glass transition temperature, its use in applications requiring high heat resistance such as hot fill bottles has been limited.

In order to solve these problems, a method of introducing isosorbide into the backbone of conventional polymers has been introduced. However, residues derived from isosorbide deteriorated the regularity of the polymer chain, which in turn deteriorated the crystallization rate of the resin. In order to ensure sufficient heat resistance, the polyester resin should contain a large amount of diol moieties derived from isosorbide, but this caused a problem that the polyester resin could not function as a crystalline resin due to the large amount of diol moieties derived from isosorbide. In addition, non-crystalline resins have low regularity of the molecular structure and so cannot be formed by drawing, and in particular, existing PET processing equipment cannot be used. Due to these problems, there was a limitation on the content of isosorbide that can be introduced into the polymer backbone.

On the other hand, when the introduced amount of isosorbide is less than 6 mol % which is insufficient, the glass transition temperature is less than 85° C., so that it does not exhibit a sufficient heat resistance. Usually, in order to be applied to applications such as a hot fill jar, the glass transition temperature is required to be at least 85° C., and so the low content of isosorbide cannot achieve the target level in terms of heat resistance.

In order to solve these problems and the like, in the case of the PET resin, the heat resistance and the mechanical strength can be improved through an additional heat treatment process after injection molding. In this case, however, the crystals produced by the heat cause a haze in the product, and generally the haze is observed even with the naked eye, and there was a limitation in its use for food containers and bottle.

Despite these technical limitations, the polyester resin according to this embodiment contains the above-mentioned ranges of diol moieties derived from isosorbide and diethylene glycol, and thus can provide a resin molded article exhibiting high transparency despite its thick thickness, while exhibiting excellent heat resistance and mechanical properties.

In addition, since the polyester resin according to one embodiment of the present invention has a melting point during the first scan through DSC and can be formed by drawing, there is an advantage in that existing PET processing equipment can be used.

In the case of PET resin, the crystallization rate is very high, and when formed to a thick thickness, haze is generated. In particular, it is difficult to transparently prepare a specimen having a thickness of 6 mm with PET resin.

In contrast, the polyester resin according to one embodiment of the present invention may have a haze of less than 3%, less than 2.5%, less than 2%, less than 1.5%, or less than 1.0% as measured according to ASTM D1003-97 when prepared into a specimen having a thickness of 6 mm. When the polyester resin according to one embodiment of the present invention is prepared into a specimen having a thickness of 6 mm, no haze may be observed. Thus, the lower limit of the haze may be 0%.

Hereinafter, a method for preparing such polyester resin will be described in detail.

The polyester resin may be prepared by the method comprising the steps of:

(a) carrying out an esterification reaction or a transesterification reaction of (i) a dicarboxylic acid or a derivative thereof including terephthalic acid or a derivative thereof and (ii) a diol including 6.5 mol to 25 mol of isosorbide and 80 mol to 200 mol of ethylene glycol based on 100 mol of the total dicarboxylic acid or a derivative thereof; and (b) subjecting the esterification or transesterification reaction product to a polycondensation reaction so that an intrinsic viscosity, which is measured at 35° C. after dissolving the reaction product in orthochlorophenol at a concentration of 1.2 g/dl at 150° C. for 15 minutes, reaches 0.45 dl/g to 0.75 dl/g.

More specifically, the polyester resin is obtained by (a) carrying out an esterification reaction or a transesterification reaction of (i) the dicarboxylic acid or a derivative thereof and (ii) the diol under a pressure of 0 to 10.0 kgf/cm$^2$ (absolute pressure of 0 to 7355.6 mmHg) and a temperature of 150 to 300° C. for an average residence time of 1 to 24 hours, and then (b) subjecting the esterification or transesterification reaction product to a polycondensation reaction under a reduced pressure condition of 400 to 0.01 mmHg at a temperature of 150 to 300° C. for an average residence time of 1 to 24 hours.

Herein, the preparation method of the polyester resin may be carried out as a batch process, a semi-continuous process or a continuous process, and the esterification reaction or transesterification reaction and the polycondensation reaction are preferably carried out under an inert gas atmosphere, the mixing of the polyester resin with other additives may be simple mixing or mixing by extrusion.

In addition, if necessary, a solid phase polymerization reaction may proceed in succession. Specifically, the method for preparing the polyester resin according to one embodiment of the present invention may further include, after step (b), (c) a step of crystallizing the polymer prepared by polycondensation reaction (melt polymerization); and (d) a step of subjecting the crystallized polymer to a solid phase polymerization such that the intrinsic viscosity, which is measured at 35° C. after dissolving the polymer in orthochlorophenol at a concentration of 1.2 g/dl at 150° C. for 15 minutes, reaches a value of 0.10 to 0.40 dl/g higher than the intrinsic viscosity of the resin obtained in step (b).

As used herein, the term "dicarboxylic acid or a derivative thereof" means at least one compound selected from dicarboxylic acid and a derivative of dicarboxylic acid. The term "derivative of dicarboxylic acid" means an alkyl ester of dicarboxylic acid (lower alkyl ester having 1 to 4 carbon atoms such as monomethyl, monoethyl, dimethyl, diethyl or dibutyl ester, etc.) or an anhydride of dicarboxylic acid. Thus, for example, terephthalic acid or a derivative thereof is collectively referred to as terephthalic acid; monoalkyl or dialkyl terephthalate; and compounds of forming a terephthaloyl moiety by reaction with diols, such as terephthalic acid anhydride.

As the (i) dicarboxylic acid or derivatives thereof, terephthalic acid or a derivative thereof is mainly used. Specifically, terephthalic acid or a derivative thereof may be used alone as the (i) dicarboxylic acid or derivatives thereof. Further, the (i) dicarboxylic acid or derivatives thereof may be used in the form of a mixture of terephthalic acid or a derivative thereof; and at least one selected from the group consisting of an aromatic dicarboxylic acid having 8 to 14 carbon atoms or a derivative thereof and an aliphatic dicarboxylic acid having 4 to 12 carbon atoms or a derivative thereof, which is a dicarboxylic acid or a derivative thereof other than the terephthalic acid or a derivative thereof. The aromatic dicarboxylic acid having 8 to 14 carbon atoms or a derivative thereof may include an aromatic dicarboxylic acid or a derivative thereof commonly used in the preparation of polyester resins, for example, naphthalene dicarboxylic acid such as isophthalic acid, dimethyl isophthalate, phthalic acid, dimethyl phthalate, phthalic anhydride, 2,6-naphthalene dicarboxylic acid or the like, dialkyl naphthalene dicarboxylate such as dimethyl 2,6-naphthalene dicarboxylate, or the like, diphenyldicarboxylic acid, and the like. The aliphatic dicarboxylic acid having 4 to 12 carbon atoms or a derivative thereof may include a linear, branched or cyclic aliphatic dicarboxylic acid or a derivative thereof conventionally used in the preparation of polyester resins, for example, cyclohexanedicarboxylic acid such as 1,4-cyclohexanedicarboxylic acid, 1,3-cyclohexanedicarboxylic acid, or the like, cyclohexanedicarboxylate such as dimethyl 1,4-cyclohexanedicarboxylate, dimethyl 1,3-cyclohexanedicarboxylate or the like, sebacic acid, succinic acid, isodecyl succinic acid, maleic acid, maleic anhydride, fumaric acid, adipic acid, glutaric acid, azelaic acid, and the like.

The (i) dicarboxylic acid or a derivative thereof may include terephthalic acid or a derivative thereof in an amount of 50 mol % or more, 60 mol % or more, 70 mol % or more, 80 mol % or more, or 90 mol % or more based on the total (i) dicarboxylic acids or derivatives thereof. The (i) dicarboxylic acid or a derivative thereof may include a dicarboxylic acid or a derivative thereof other than terephthalic acid or a derivative thereof in an amount of 0 to 50 mol %, greater than 0 mol % and 50 mol % or less, or 0.1 to 40 mol % based on the total (i) dicarboxylic acids or derivatives thereof. Within such a content range, the polyester resin realizing appropriate physical properties can be prepared.

Meanwhile, the isosorbide (1,4:3,6-dianhydroglucitol) is used such that the diel moiety derived from isosorbide is 6 to 12 mol based on the total diol moieties derived from the diol of the polyester resin prepared.

A part of isosorbide may be volatilized or not reacted during the synthesis of the polyester resin. Therefore, in order to introduce the above-mentioned content of isosorbide into the polyester resin, the isosorbide may be used in an amount of or 6.5 mol to 25 mol based on 100 mol of the total dicarboxylic acids or derivatives thereof.

If the content of isosorbide exceeds the above range, a melting point does not exist during the first scan through DSC and so processing by drawing becomes difficult. If the content is less than the above range, sufficient heat resistance and mechanical strength may not be exhibited, and a haze may generate. However, when the content of isosorbide is adjusted within the above-mentioned range, a melting point exists during the first scan through DSC, and when prepared into a specimen having a thickness of 6 mm, the polyester resin exhibiting high transparency can be provided.

The content of the diol moiety derived from diethylene glycol introduced into the polyester resin is not directly proportional to the content of ethylene glycol used for the preparation of the polyester resin. However, ethylene glycol may be used in an amount of 80 mol to 200 mol based on 100 mol of the total dicarboxylic acids or derivatives thereof so that the diol moiety derived from diethylene glycol is 2 to 5 mol % based on the total diol moieties derived from the diol of the polyester resin.

If the content of the diol moiety derived from diethylene glycol introduced into the polyester resin exceeds the above range, it may not exhibit sufficient heat resistance, and if the content is less than the above range, a haze may generate.

The (ii) diol may include a compound commonly used in the preparation of polyester resins as the diol other than isosorbide, and examples thereof include an aromatic diol having 8 to 40 carbon atoms or 8 to 33 carbon atoms, an aliphatic diol having 2 to 20 carbon atoms or 2 to 12 carbon atoms, or a mixture thereof.

Specific examples of the aromatic diol include bisphenol A derivatives added with ethylene oxide and/or propylene oxide (polyoxyethylene-(n)-2,2-bis(4-hydroxyphenyl)propane, polyoxypropylene-(n)-2,2-bis(4-hydroxyphenyl)propane or polyoxypropylene-(n)-polyoxyethylene-(n)-2,2-bis(4-hydroxyphenyl)propane, wherein n represents the number of polyoxyethylene unit or polyoxypropylene unit), such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, polyoxyethylene-(6)-2,2-bis(4-hydroxyphenyl)propane, and so on. Specific examples of the aliphatic diol include linear, branched or cyclic aliphatic diol components such as ethylene glycol, diethylene glycol, triethylene glycol, propanediol (1,2-propanediol, 1,3-propanediol and so on), 1,4-butanediol, pentanediol, hexanediol (1,6-hexanediol and so on), neopentyl glycol (2,2-dimethyl-1,3-propandiol), 1,2-cyclohexanediol, 1,4-cyclohexanediol, 1,2-cyclohexanedimethanol, 1,3-cyclohexanedimethanol, 1,4-cyclohexanedimethanol, tetramethylcyclobutanediol and so on. Specific examples of the aliphatic diol include a linear, branched or cyclic aliphatic diol such as diethylene glycol, triethylene glycol, propanediol (1,2-propanediol, 1,3-propanediol or the like), 1,4-butanediol, pentanediol, hexanediol (1,6-hexanediol, or the like), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethylcyclobutanediol or the like. As the (ii) diol, the above-listed diols other than the isosorbide and ethylene glycol can be included alone or in combination of two or more thereof. For example, 1,4-cyclohexanedimethanol, polyoxyethylene-(2.0)-2,2-bis(4-hydroxyphenyl)propane or the like may be added alone or in combination of two or more thereof to the isosorbide and ethylene glycol. In the (ii) diol, the content of the diol used for improving the physical properties in addition to isosorbide and ethylene glycol may be adjusted, for example, to 0 to 50 mol % or 0.1 to 30 mol %, based on the total (ii) diols.

In order to prepare the polyester resin according to one embodiment, the (i) dicarboxylic acid or a derivative thereof and the (ii) diol may be added to a reactor so that the molar ratio between the (i) dicarboxylic acid or a derivative thereof and the (ii) diol is 1.01 or more. In addition, the (ii) diol may be supplied to the reactor at one time before the polymerization reaction or may be added during the polymerization reaction several times, if necessary.

According to a more specific embodiment, the polyester resin satisfying a specific molecular weight distribution may be prepared by adjusting the initial input amount of the (i) dicarboxylic acid or a derivative thereof and the (ii) diol in the initial stage of a reaction. Thereby, the polyester resin of one embodiment can be more effectively obtained.

In one example, when a dicarboxylic acid is used as the (i) dicarboxylic acid or a derivative thereof, the initial mixing molar ratio between the (i) dicarboxylic acid or a derivative thereof and the (ii) diol may be adjusted to 1:1.01 to 1.05, and when a derivative such as a dicarboxylic acid alkyl ester or a dicarboxylic acid anhydride is used as the (i) dicarboxylic acid or a derivative thereof, the initial mixing molar ratio between the (i) dicarboxylic acid derivative and the (ii) diol may be adjusted to 1:2.0 to 1:2.1.

The initial mixing molar ratio may refer to a mixing molar ratio at the start of the polymerization reaction in the reactor, and (i) dicarboxylic acid or a derivative and/or (ii) diol may be further added during the reaction if necessary.

Meanwhile, a catalyst may be used in the (a) esterification reaction or transesterification reaction. Examples of the catalyst include a methylate of sodium and magnesium; an acetate, a borate, a fatty acid salt, a carbonate, and an alkoxy salt of Zn, Cd, Mn, Co, Ca, Ba, Ti or the like; metal Mg; an oxide of Pb, Zn, Sb, Ge, or the like.

The (a) esterification reaction or the transesterification reaction may be performed as a batch process, a semi-continuous process or a continuous process, and each raw material may be added separately, but it may be preferably added in the form of a slurry in which the dicarboxylic acid or a derivative thereof is mixed to the diol.

A polycondensation catalyst, a stabilizer, a coloring agent, a crystallizing agent, an antioxidant, a branching agent and the like may be added to the slurry before the start of the (a) esterification reaction or the transesterification reaction, or to the product after the completion of the reaction.

However, the timing of adding the above-described additives is not limited thereto, and they may be added at any time point during the preparation of the polyester resin. As the polycondensation catalyst, at least one of conventional titanium-based catalyst, germanium-based catalyst, antimony-based catalyst, aluminum-based catalyst, tin-based catalyst, or the like may be appropriately selected and used. Examples of the useful titanium-based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, titanium dioxide/silicon dioxide copolymer, titanium dioxide/zirconium dioxide copolymer or the like. Further, examples of the useful germanium-based catalyst include germanium dioxide and a copolymer thereof. As the stabilizer, generally, a phosphor-based stabilizer such as phosphoric acid, trimethyl phosphate, triethyl phosphate, or the like may be used, and the added amount thereof may be in the range of 10 ppm to 200 ppm relative to the weight of the final polymer (polyester resin) based on the amount of phosphorus atom. If the added amount of the stabilizer is less than 10 ppm, the polyester resin may not be sufficiently stabilized and the color of the polyester resin may become yellow. If the amount of phosphor is more than 200 ppm, a desired polymer having a high degree of polymerization may not be obtained. Examples of the coloring agent added for improving the color of the polymer include a cobalt-based decoloring agent such as cobalt acetate, cobalt propionate or the like, and the added amount thereof is 10 to 200 ppm relative to the weight of the final polymer (polyester resin) based on the amount of cobalt atom. If necessary, as an organic coloring agent, an anthraquionone-based compound, a perinone-based compound, an azo-based compound, a methine-based compound and the like may be used. Commercially available products include a toner such as polysynthrene Blue RLS manufactured by Clarient or Solvaperm Red BB manufactured by Clarient. The added amount of the organic coloring agent may be adjusted in the range of 0 to 50 ppm relative to the weight of the final polymer. If the coloring agent is used in an amount outside the above range, the yellow color of the polyester resin may not be sufficiently concealed or the physical properties may be deteriorated.

Examples of the crystallizing agent include a crystal nucleating agent, an UV absorber, a polyolefin-based resin, a polyamide resin or the like. Examples of the antioxidant include a hindered phenol-based antioxidant, a phosphite-based antioxidant, a thioether-based antioxidant, or a mixture thereof. As the branching agent, for example, trimellitic anhydride, trimethylol propane, trimellitic acid or a mixture thereof may be used as a conventional branching agent having three or more functional groups.

The (a) esterification reaction or the transesterification reaction may be carried out at a temperature of 150 to 300° C. or 200 to 270° C. under a pressure condition of 0 to 10.0 kgf/cm$^2$ (0 to 7355.6 mmHg), 0 to 5.0 kgf/cm$^2$ (0 to 3677.8 mmHg) or 0.1 to 3.0 kgf/cm$^2$ (73.6 to 2206.7 mmHg). Here, the pressure stated in the outside of the parenthesis refers to a gauge pressure (expressed in kgf/cm$^2$); and the pressure stated in the parenthesis refers to an absolute pressure (expressed in mmHg).

If the reaction temperature and pressure deviate from the above range, the physical properties of the polyester resin may be deteriorated. The reaction time (average retention time) is usually 1 to 24 hours or 2 to 8 hours, and may vary depending on the reaction temperature, the pressure, and the molar ratio of the dicarboxylic acid or a derivative thereof to the diol used.

The product obtained by the esterification or the transesterification reaction may be prepared into a polyester resin having a higher degree of polymerization by polycondensation reaction. Generally, the polycondensation reaction is carried out at a temperature of 150 to 300° C., 200 to 290° C. or 250 to 290° C. under a reduced pressure of 0.01 to 400 mmHg, 0.05 to 100 mmHg or 0.1 to 10 mmHg. Herein, the pressure refers to the range of absolute pressures. The reduced pressure of 0.01 mmHg to 400 mmHg is used to remove glycol as a by-product of the polycondensation reaction, and isosorbide as an unreacted material, etc. Thus, if the reduced pressure condition deviates from the above range, the by-products and unreacted materials may not be sufficiently removed. Moreover, if the temperature of the polycondensation reaction deviates from the above range, the physical properties of the polyester resin may be deteriorated. The polycondensation reaction is carried out for a period of time required to reach a desirable intrinsic viscosity, for example, it may be carried out for an average retention time of 1 hours to 24 hours.

For the purpose of reducing the amount of unreacted materials such as isosorbide remaining in the polyester resin, it is possible to intentionally increase the vacuum reaction at the last stage of the esterification reaction or transesterification reaction or at the initial stage of the polycondensation reaction, that is, at a state in which the viscosity of the resin is not sufficiently high, thereby discharging the unreacted raw materials out of the system. When the viscosity of the resin is increased, it may be difficult for raw materials remaining in the reactor to escape out of the system. In one example, before the polycondensation reaction, the reaction product obtained by the esterification reaction or the transesterification reaction is allowed to stand at a reduced pressure condition of about 400 to 1 mmHg or about 200 to 3 mmHg for 0.2 to 3 hours to effectively remove unreacted materials such as isosorbide remaining in the polyester resin. Herein, the temperature of the product may be controlled to a temperature equal to the temperature of the esterification reaction or transesterification reaction and of the polycondensation reaction, or to a temperature therebetween.

As the process of flowing out the unreacted raw materials through the control of the vacuum reaction is further added, the amount of unreacted materials such as isosorbide remaining in the polyester resin can be reduced, and consequently, the polyester resin satisfying the physical properties of one embodiment can be more effectively obtained.

Meanwhile, the intrinsic viscosity of the polymer after the polycondensation reaction is appropriately in the range of 0.45 dl/g to 0.75 dl/g.

In particular, if the crystallization step (c) and the solid phase polymerization step (d) described above are employed, the intrinsic viscosity of the polymer after the polycondensation reaction can be adjusted to 0.45 to 0.75 dl/g, 0.45 to 0.70 dl/g or 0.50 to 0.65 dl/g. If the intrinsic viscosity of the polymer after the polycondensation reaction is less than 0.45 dl/g, the reaction speed in the solid phase polymerization reaction is significantly reduced, and a polyester resin having a very high molecular weight distribution is obtained. If the intrinsic viscosity exceeds 0.75 dl/g, as the viscosity of the melt increases during the melt polymerization, the possibility of discoloration of the polymer is increased due to the shear stress between the stirrer and the reactor, and side reaction materials such as acetaldehyde are also increased. Further, the crystallization rate is remarkably slowed, and fusion occurs during the crystallization process, and the shape of the pellet is liable to be deformed.

Meanwhile, if the crystallization step (c) and the solid phase polymerization step (d) described above are not employed, the intrinsic viscosity of the polymer after the polycondensation reaction may be adjusted to 0.65 to 0.75 dl/g. If the intrinsic viscosity is less than 0.65 dl/g, the crystallization rate increases due to the low molecular weight polymer, and so it may be difficult to provide a polyester resin having excellent heat resistance and transparency. If the intrinsic viscosity exceeds 0.75 dl/g, as the viscosity of the melt increases during the melt polymerization, the possibility of discoloration of the polymer is increased due to the shear stress between the stirrer and the reactor, and side reaction materials such as acetaldehyde are also increased.

A polyester resin according to one embodiment can be produced through the steps (a) and (b). If necessary, the crystallization step (c) and the solid phase polymerization step (d) may be further carried out after the (b) polycondensation reaction to provide a polyester resin having a higher degree of polymerization.

Specifically, in the crystallization step (c), the polymer obtained by the polycondensation reaction (b) is discharged out of the reactor to be granulated. As the granulation method, a strand cutting method of extruding into a strand type, solidifying in a cooling liquid and then cutting with a cutter, or an underwater cutting method of immersing a die hole in a cooling liquid, directly extruding in a cooling liquid and then cutting with a cutter can be used. Generally, in the strand cutting method, the cooling liquid is maintained at a low temperature to enable the solidification of the strand, thereby preventing cutting problems. In the underwater cutting method, it is preferred that the temperature of the cooling liquid is maintained in accordance with the polymer so that the shape of the polymer becomes uniform. However, in the case of a crystalline polymer, the temperature of the cooling liquid may be intentionally maintained at a high level in order to induce crystallization during discharge.

Meanwhile, it is also possible to additionally wash the granulated polymer with water. The temperature of water during washing is preferably equal to or lower by about 5 to 20° C. than the glass transition temperature of the polymer, and fusion may occur at a higher temperature, which is not preferable. In the case of polymer particles that induce the crystallization during discharge, fusion does not occur at a temperature higher than the glass transition temperature, and thus, the temperature of water may be set according to the degree of crystallization. Through washing of the granulated polymer, the raw materials dissolved in water among the unreacted raw materials can be removed. As the particle size decreases, the surface area relative to the weight of the particles increases, and thus, a smaller particle size is preferred. In order to achieve such purpose, the particles may be prepared to have an average weight of about 14 mg or less.

The granulated polymer undergoes the crystallization step to prevent fusion during the solid phase polymerization. The crystallization may be carried out under the atmosphere, inert gas, water vapor, vapor-containing inert gas atmosphere or in a solution at 110° C. to 180° C. or 120° C. to 180° C. If the temperature is low, the rate at which the crystals of the particles are formed is too slow. If the temperature is high, the particles are melted at a faster rate than the rate at which the crystals are formed, making the particles to stick together, thereby causing fusion to occur. Since the heat resistance of the particles increases as the particles are crystallized, it is also possible to carry out the crystallization by dividing it into several steps and raising the temperature stepwise.

The solid phase polymerization reaction may be carried out under an inert gas atmosphere such as nitrogen, carbon dioxide, argon or the like, or under a reduced pressure condition of 400 to 0.01 mmHg at a temperature of 180° C. to 220° C. for an average retention time of 1 hour or more, preferably 10 hours or more. This solid phase polymerization further increases the molecular weight, and the raw materials, which remain unreacted in the melting reaction, and cyclic oligomers, acetaldehydes and the like generated during the reaction may be removed.

In order to provide the polyester resin according to one embodiment, the solid phase polymerization may be carried out until the intrinsic viscosity reaches a value of 0.10 dl/g to 0.40 dl/g higher than the intrinsic viscosity of the resin obtained in the polycondensation reaction step (b). If the difference between the intrinsic viscosity of the resin after the solid phase polymerization reaction and the intrinsic viscosity of the resin before the solid phase polymerization is less than 0.10 dl/g, a sufficient degree of polymerization improving effect cannot be obtained. If the difference between the intrinsic viscosity of the resin after the solid phase polymerization and the intrinsic viscosity of the resin before the solid phase polymerization exceeds 0.40 dl/g, the molecular weight distribution becomes wide and so a sufficient heat resistance cannot be exhibited, and further the content of the low molecular weight polymer is relatively increased and the crystallization rate is increased, and thereby the possibility of generation of a haze is increased.

The solid phase polymerization is carried out until the intrinsic viscosity of the resin is 0.10 to 0.40 dl/g higher than the intrinsic viscosity of the resin before the solid phase polymerization, and the intrinsic viscosity reaches a value of 0.70 dl/g or more, 0.70 to 1.0 dl/g, or 0.70 to 0.95 dl/g. When the solid phase polymerization is continued until it reaches the intrinsic viscosity within such range, the molecular weight distribution of the polymer becomes narrower, thereby decreasing the crystallization rate during molding. Accordingly, the heat resistance and the degree of crystallinity can be improved without deteriorating the transparency. If the intrinsic viscosity of the resin after the solid phase polymerization reaction is less than the above range, it may be difficult to provide a polyester resin having excellent heat resistance and transparency due to an increase in the crystallization rate by the low molecular weight polymer.

The polyester resin prepared by the above method has an alternating structure of an acid moiety derived from a dicarboxylic acid or a derivative thereof and a diol moiety derived from a diol. In the specification, the acid moiety and the diol moiety refers to a residue remaining after the dicarboxylic acid or a derivative thereof and the diol are polymerized and hydrogen, hydroxyl or alkoxy groups are removed therefrom.

In particular, the polyester resin is prepared according to the method described above, whereby a diol moiety derived from isosorbide is 6 to 12 mol %, and a diol moiety derived from diethylene glycol is 2 to 5 mol %, based on the total diol moieties derived from the diol, a melting point exists during the first scan through a differential scanning calorimetry (DSC), and a haze is less than 3% when prepared into a specimen having a thickness of 6 mm.

The diol moiety derived from the diethylene glycol may be that introduced by reaction of two ethylene glycols to form diethylene glycol, and then reaction of such diethylene glycol with a dicarboxylic acid or a derivative thereof. As the polyester resin according to one embodiment of the present invention is prepared by the above-mentioned method, it includes a diol moiety derived from diethylene glycol in the above-mentioned content range, thereby providing a resin molded article having excellent heat resistance and mechanical properties and exhibiting high transparency despite its thick thickness.

The polyester resin may have a number average molecular weight (Mn) of about 15,000 to 50,000 g/mol or about 18,000 to 40,000 g/mol. The polyester resin may have a weight average molecular weight (Mw) of 50,000 to 150,000 g/mol or 60,000 to 110,000 g/mol. Further, the molecular weight distribution (PDI) of the polyester resin may be in the range of 2.5 to 4.0 or 2.8 to 3.85.

If the molecular weight is less than the above range, it is difficult to secure desired mechanical properties because sufficient drawing is not made when developed into a bottle, sheet, multilayer sheet, drawn film or fiber. If the molecular weight exceeds the above range, the molding processability may be deteriorated. On the other hand, when the molecular weight distribution is adjusted within the above-mentioned range, the relative content of the low molecular weight polymer is small and the crystallization rate is sufficiently slow, so that the heat resistance and transparency of the resin molded article are improved.

The polyester resin may have a melting point (Tm) of about 200 to 250° C., about 200 to 240° C., or 210 to 236° C., as measured during the first scan through a differential scanning calorimetry (DSC). Within this range, the polyester resin has appropriate crystallinity, exhibits good heat resistance and mechanical properties, can be processed at an appropriate temperature, and thus there is no possibility of yellowing.

The polyester resin may have a glass transition temperature (Tg) of 85° C. or more, or 85° C. to 95° C., or 85° C. to 92° C. Within this range, it can be used for applications such as hot fill jar, and various physical properties of the polyester resin can be favorably exhibited without a yellowing phenomenon.

As described above, the polyester resin according to one embodiment of the present invention can provide a resin molded article having excellent heat resistance and mechanical properties, and exhibiting high transparency while having a thick wall thickness. Accordingly, the polyester resin can be utilized in various fields, and in particular, because of its excellent heat resistance and transparency, it is expected to be useful for applications in a bottle, a hot fill jar, a high-pressure vessel, a sheet, a drawn film and a fiber.

Meanwhile, according to anther embodiment of the present invention, there is provided a molded article formed from the polyester resin. The resin molded article may have a very thick wall thickness of 4.5 mm or more, 4.5 mm to 30 mm, 4.5 mm to 10 mm, 4.5 mm to 7 mm, or about 6 mm. Nevertheless, the resin molded article can exhibit very high transparency. The resin molded article may be a bottle, a hot fill jar, a high-pressure vessel, a sheet, a drawn film, a fiber, or the like.

Hereinafter, the action and effect of the present invention will be described by way of specific Examples. However, these Examples are given for illustrative purposes only, and they are not intended to limit the scope of the invention in any manner.

The following physical properties were measured according to the methods below.

(1) Intrinsic viscosity (IV): The intrinsic viscosity of the specimen was measured using an Ubbelohde viscometer after dissolving the specimen in orthochlorophenol (OCP) at a concentration of 1.2 g/dl at 150° C. for 15 minutes. Specifically, the temperature of the viscometer was maintained at 35° C. and the time (efflux time) to required for a solvent to pass between the specific internal sections of the viscometer and the time t required for a solution to pass therebetween were determined. Thereafter, the value of to and the value of t were substituted into Equation 1 to calculate a specific viscosity, and the calculated specific viscosity value was substituted into Equation 2 to calculate an intrinsic viscosity.

$$\eta_{sp} = \frac{t - t_0}{t_0} \qquad [\text{Equation 1}]$$

$$[\eta] = \frac{\sqrt{1 + 4A\eta_{sp}} - 1}{2Ac} \qquad [\text{Equation 2}]$$

in Equation 2, A represents the Huggins constant, which was 0.247, and c represents a concentration value, which was 1.2 g/dl.

(2) Melting temperature (Tm) and glass transition temperature (Tg): Tm and Tg of the polyester resins prepared in Examples and Comparative Examples were measured by differential scanning calorimetry (DSC). As the measuring device, DSC 1 model (Mettler Toledo) was used. Specifically, the polyester resin sample to be used for the analysis was dried under a nitrogen atmosphere at 120° C. for 5 to 10 hours using a dehumidifying dryer (model name: D2T manufactured by Moretto). Therefore, Tm and Tg were measured in a state where the amount of water remaining in the sample was less than 500 ppm.

<Tm Measurement>

About 6 to 10 mg of the dried sample was taken and filled in an aluminum pan. Then, the sample was kept at 30° C. for 3 minutes, heated from 30° C. to 280° C. at a rate of 10° C./min, and then the temperature was maintained at 280° C. for 3 minutes (first scan). Then, Tm peak (melting point) value was analyzed in the first scan through the DSC using the integration function in the TA menu of the related program (STARe Software) provided by Mettler Toledo. The first scan temperature range was set from onset point of −10° C. to Tm peak +10° C. calculated from the program.

<Tg Measurement>

After the first scan was performed in the same manner as in the method for measuring Tm, the sample was rapidly cooled to room temperature, and again heated from room temperature to 280° C. at a rate of 10° C./min to obtain a DSC curve (second scan). Then, the Tg (glass transition temperature) value in the DSC $2^{nd}$ scan was analyzed through the glass transition function in the DSC menu of the STARe Software. Herein, the Tg is defined as the temperature at which the maximum slope of the curve appears at the point where the DSC curve obtained during the second scan changes to a stair shape for the first time during the temperature rising process. The temperature range of the scan was set from −20° C.–15° C. to 15° C.–20° C. of the midpoint calculated from the program.

(3) Molecular Weight

The molecular weight and the molecular weight distribution of the polyester resin prepared in Examples and Comparative Examples were measured by GPC (Gel Permeation Chromatography). Specifically, 0.03 g of a polyester resin to be tested for molecular weight was added to 3 mL of o-chlorophenol, dissolved at 150° C. for 15 minutes, and then cooled to room temperature, to which 9 mL of chloroform was added to prepare a sample. Gel permeation chromatography of the sample was then performed using two columns (Shodex LF 804) at a temperature of 40° C. and a flow rate of 0.7 mL/min. The weight average molecular weight (Mw) and the number average molecular weight (Mn) were respectively calculated using polystyrene as a standard material, and the molecular weight distribution (PDI=Mw/Mn) was calculated from Mw and Mn.

(4) Haze

Specimens having a thickness of 6 mm were prepared by using the polyester resins prepared in Examples and Comparative Examples, and the haze of the specimens was measured using a CM-3600A measuring device (Minolta) according to ASTM D1003-97 test method.

(5) 1 Stage Bottle Molding:

A preform having a wall thickness of 4.5 mm and a height of 115 mm was prepared by using the polyester resins prepared in Examples and Comparative Examples with a 1 Stage Blow machine (NISSEI ASB) and then molded into a bottle having a height of 130 mm. Subsequently, the generation of haze was observed with the naked eye. If no haze was observed, it was indicated as 'OK', and if haze was observed, it was indicated as 'Haze'.

(6) 2 Stage Bottle Molding:

A preform having a wall thickness of 4.5 mm and a height of 100 mm was prepared by using the polyester resin prepared in Examples and Comparative Examples. Subsequently, the preform was molded into a bottle having a height of 210 mm through a heating/blowing process. If there is no abnormality in the 2 stage bottle molding process and no haze is observed from the appearance of the finally molded product, it is indicated as 'OK', and if there is an abnormality in the molding process or a haze is observed from the appearance of the finally molded article, it is indicated as 'NG'.

Example 1: Preparation of Polyester Resin 3222 g (19.4 mol) of terephthalic acid, 1155 g (18.6 mol) of ethylene glycol, and 227 g (1.6 mol) of isosorbide were added to a 10 L reactor equipped with a column and a water-cooled condenser. 1.0 g of $GeO_2$ as a catalyst, 1.46 g of phosphoric acid as a stabilizer and 0.7 g of cobalt acetate as a coloring agent were used (molar ratio between dicarboxylic acid or its derivative and diol: 1:1.04). Then, nitrogen was injected into the reactor to create a pressurized state in which the pressure of the reactor was higher than the atmospheric pressure by 1.0 kgf/cm² (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

The pressure of the reactor was reduced to 5 Torr (absolute pressure: 5 mmHg) at normal pressure for 30 minutes, and simultaneously the temperature of the reactor was raised to 280° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.60 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 150° C. for 1 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 200° C. at a rate of 40° C./hour and maintained at 200° C. The solid phase polymerization was carried out until the intrinsic viscosity (IV) of the particles in the reactor reached 0.75 dl/g.

With respect to the total acid-derived residue contained in the polyester resin thus prepared, the residue derived from terephthalic acid was 100 mol %. With respect to the total diol-derived residue, the residue derived from isosorbide was 6 mol %, the residue derived from ethylene glycol was 91 mol % and the residue derived from diethylene glycol was 3 mol %.

As a result of measuring the physical properties of the polyester resin according to the above-mentioned methods, it was confirmed that Tm in the DSC $1^{st}$ scan was 236° C., Tg ($2^{nd}$ scan) 85° C., Mn 19,000, Mw 70,000, PDI 3.68 and haze 2.4%.

During molding of the 1 stage bottle using the polyester resin, haze was not observed with the naked eye. There was no problem in moldability and appearance even in 2 stage bottle molding.

Example 2: Preparation of Polyester Resin 3215 g (19.4 mol) of terephthalic acid, 1135 g (18.3 mol) of ethylene glycol, and 240 g (1.6 mol) of isosorbide were added to a 10 L reactor equipped with a column and a water-cooled condenser. 1.0 g of $GeO_2$ as a catalyst, 1.46 g of phosphoric acid as a stabilizer, 0.7 g of cobalt acetate as a coloring agent and 100 ppm of trimellitic anhydride as a branching agent were used (molar ratio between dicarboxylic acid or its derivative and diol: 1:1.03). Then, nitrogen was injected into the reactor to create a pressurized state in which the pressure of the reactor was higher than the atmospheric pressure by 1.0 $kgf/cm^2$ (absolute pressure: 1495.6 mmHg).

Then, the temperature of the reactor was raised to 220° C. for 90 minutes, maintained at 220° C. for 2 hours, and then raised to 260° C. for 2 hours. Then, the temperature of the reactor was maintained at 260° C. During this process, after confirming that 500 g of by-products were discharged through the column and the condenser, 123 g (2.0 mol) of ethylene glycol was further added to the reactor. The mixture in the reactor was observed with the naked eye, and the temperature of the reactor was maintained at 260° C. until the mixture became transparent. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and simultaneously the temperature of the reactor was raised to 280° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.65 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 150° C. for 1 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 200° C. at a rate of 40° C./hour and maintained at 200° C. The solid phase polymerization was carried out until the intrinsic viscosity (IV) of the particles in the reactor reached 0.95 dl/g.

With respect to the total acid-derived residue contained in the polyester resin thus prepared, the residue derived from terephthalic acid was 100 mol %. With respect to the total diol-derived residue, the residue derived from isosorbide was 6 mol %, the residue derived from ethylene glycol was 90 mol % and the residue derived from diethylene glycol was 4 mol %.

As a result of measuring the physical properties of the polyester resin according to the above-mentioned methods, it was confirmed that Tm in the DSC $1^{st}$ scan was 236° C., Tg ($2^{nd}$ scan) 85° C., Mn 28,000, Mw 95,000, PDI 3.39 and haze 1.2%.

During molding of the 1 stage bottle using the polyester resin, haze was not observed with the naked eye. There was no problem in moldability and appearance even in 2 stage bottle molding.

Example 3: Preparation of Polyester Resin 3387 g (20.4 mol) of terephthalic acid, 1176 g (19.0 mol) of ethylene glycol, and 357 g (2.4 mol) of isosorbide were added to a 10 L reactor equipped with a column and a water-cooled condenser. 1.0 g of $GeO_2$ as a catalyst, 0.016 g of Polysynthrene Blue RLS (Clarient) as a blue toner, and 0.004 g of Solvaperm Red Red (Clarient) as a red toner were used (molar ratio between dicarboxylic acid or its derivative and diol: 1:1.05). Then, nitrogen was injected into the reactor to create a pressurized state in which the pressure of the reactor was higher than the atmospheric pressure by 1.0 $kgf/cm^2$ (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and simultaneously the temperature of the reactor was raised to 280° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.60 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg. The particles thus obtained were stored in water at 70° C. for 5 hours to remove unreacted raw materials contained in the particles.

The particles were allowed to stand at 140° C. for 3 hours and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 195° C. at a rate of 40° C./hour and maintained at 195° C. The solid phase polymerization was carried out until the intrinsic viscosity (IV) of the particles in the reactor reached 0.85 dl/g.

With respect to the total acid-derived residue contained in the polyester resin thus prepared, the residue derived from terephthalic acid was 100 mol %. With respect to the total diol-derived residue, the residue derived from isosorbide was 10 mol %, the residue derived from ethylene glycol was 86.5 mol % and the residue derived from diethylene glycol was 3.5 mol %.

As a result of measuring the physical properties of the polyester resin according to the above-mentioned methods, it was confirmed that Tm in the DSC $1^{st}$ scan was 220° C., Tg ($2^{nd}$ scan) 90° C., Mn 25,000, Mw 83,000, PDI 3.32 and haze 1%.

During molding of the 1 stage bottle using the polyester resin, haze was not observed with the naked eye. There was no problem in moldability and appearance even in 2 stage bottle molding.

Example 4: Preparation of Polyester Resin 3824 g (19.7 mol) of dimethyl terephthalate, 2237 g (36.1 mol) of ethylene glycol, and 633 g (4.3 mol) of isosorbide were added to a 10 L reactor equipped with a column and a water-cooled condenser. 1.5 g of Mn(II) acetate tetrahydrate and 1.8 g of $Sb_2O_3$ as a catalyst, 1.0 g of phosphoric acid as a stabilizer and 1.1 g of cobalt acetate as a coloring agent were used (molar ratio between dicarboxylic acid or its derivative and diol: 1:2.05). Then, nitrogen was injected into the reactor, but the pressure of the reactor was not allowed to increase (absolute pressure: 760 mmHg).

Then, the temperature of the reactor was raised to 220° C. for 90 minutes, maintained at 220° C. for 2 hours, and then raised to 240° C. for 2 hours. Thereafter, the mixture in the reactor was observed with the naked eye, and the esterification reaction was carried out while maintaining the temperature of the reactor at 240° C. until the mixture became transparent. During this process, 650 g of by-products were discharged through the column and the condenser. When the esterification reaction was completed, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and simultaneously the temperature of the reactor was raised to 285° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.60 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg. The particles thus obtained were stored in water at 70° C. for 5 hours to remove unreacted raw materials contained in the particles.

The particles were allowed to stand at 115° C. for 6 hours and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 205° C. at a rate of 40° C./hour and maintained at 205° C. The solid phase polymerization was carried out until the intrinsic viscosity (IV) of the particles in the reactor reached 0.95 dl/g.

With respect to the total acid-derived residue contained in the polyester resin thus prepared, the residue derived from terephthalic acid was 100 mol %. With respect to the total diol-derived residue, the residue derived from isosorbide was 6 mol %, the residue derived from ethylene glycol was 91 mol % and the residue derived from diethylene glycol was 3 mol %.

As a result of measuring the physical properties of the polyester resin according to the above-mentioned methods, it was confirmed that Tm in the DSC $1^{st}$ scan was 236° C., Tg ($2^{nd}$ scan) 85° C., Mn 27,000, Mw 103,000, PDI 3.81 and haze 1.3%.

During molding of the 1 stage bottle using the polyester resin, haze was not observed with the naked eye. There was no problem in moldability and appearance even in 2 stage bottle molding.

Example 5: Preparation of Polyester Resin 3340 g (20.1 mol) of terephthalic acid, 104 g (0.63 mol) of isophthalic acid, 1248 g (20.1 mol) of ethylene glycol, and 242 g (1.7 mol) of isosorbide were added to a 10 L reactor equipped with a column and a water-cooled condenser. 1.0 g of $GeO_2$ as a catalyst, 1.56 g of phosphoric acid as a stabilizer, 0.012 g of Polysynthrene Blue RLS (Clarient) as a blue toner, and 0.004 g of Solvaperm Red Red (Clarient) as a red toner were used (molar ratio between dicarboxylic acid or its derivative and diol: 1:1.05). Then, nitrogen was injected into the reactor to create a pressurized state in which the pressure of the reactor was higher than the atmospheric pressure by 1.0 kgf/cm² (absolute pressure: 1495.6 mmHg).

Then, the temperature of the reactor was raised to 220° C. for 90 minutes, maintained at 220° C. for 2 hours, and then raised to 255° C. for 2 hours. Thereafter, the mixture in the reactor was observed with the naked eye, and the esterification reaction was carried out while maintaining the temperature of the reactor at 255° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and simultaneously the temperature of the reactor was raised to 280° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.60 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg The particles were allowed to stand at 140° C. for 3 hours and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 200° C. at a rate of 40° C./hour and maintained at 200° C. The solid phase polymerization was carried out until the intrinsic viscosity (IV) of the particles in the reactor reached 0.90 dl/g.

With respect to the total acid-derived residue contained in the polyester resin thus prepared, the residue derived from terephthalic acid was 100 mol %. With respect to the total diol-derived residue, the residue derived from isosorbide was 6 mol %, the residue derived from ethylene glycol was 90.5 mol % and the residue derived from diethylene glycol was 3.5 mol %.

As a result of measuring the physical properties of the polyester resin according to the above-mentioned methods, it was confirmed that Tm in the DSC $1^{st}$ scan was 236° C., Tg ($2^{nd}$ scan) 85° C., Mn 27,000, Mw 87,000, PDI 3.22 and haze 1.2%.

During molding of the 1 stage bottle using the polyester resin, haze was not observed with the naked eye. There was no problem in moldability and appearance even in 2 stage bottle molding.

Example 6: Preparation of Polyester Resin 3250 g (19.6 mol) of terephthalic acid, 1093 g (17.6 mol) of ethylene glycol, and 400 g (2.7 mol) of isosorbide were added to a 10 L reactor equipped with a column and a water-cooled condenser. 1.0 g of $GeO_2$ as a catalyst, 1.56 g of phosphoric acid as a stabilizer, 0.016 g of Polysynthrene Blue RLS (Clarient) as a blue toner, 0.004 g of Solvaperm Red Red (Clarient) as a red toner, 1 ppm of polyethylene as a crystallizing agent, and 100 ppm of Iganox 1076 as an antioxidant were used (molar ratio between dicarboxylic acid or its derivative and diol: 1:1.04). Then, nitrogen was injected into the reactor to create a pressurized state in which the pressure of the reactor was higher than the atmospheric pressure by 0.5 kgf/cm² (absolute pressure: 1127.8 mmHg).

Then, the temperature of the reactor was raised to 220° C. for 90 minutes, maintained at 220° C. for 2 hours, and then raised to 255° C. for 2 hours. Thereafter, the mixture in the reactor was observed with the naked eye, and the esterification reaction was carried out while maintaining the temperature of the reactor at 255° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 100 Torr (absolute pressure: 100 mmHg) at normal pressure for 10 minutes, and this pressure state was maintained for 1 hour. Then, the temperature of the reactor was raised to 275° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.50 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg The particles were allowed to stand at 140° C. for 3 hours and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 190° C. at a rate of 40° C./hour and maintained at 190° C. The solid phase polymerization was carried out until the intrinsic viscosity (IV) of the particles in the reactor reached 0.70 dl/g.

With respect to the total acid-derived residue contained in the polyester resin thus prepared, the residue derived from terephthalic acid was 100 mol %. With respect to the total diol-derived residue, the residue derived from isosorbide was 12 mol %, the residue derived from ethylene glycol was 83 mol % and the residue derived from diethylene glycol was 5 mol %.

As a result of measuring the physical properties of the polyester resin according to the above-mentioned methods, it was confirmed that Tm in the DSC $1^{st}$ scan was 210° C., Tg ($2^{nd}$ scan) 90° C., Mn 22,000, Mw 68,000, PDI 3.09 and haze 0.8%.

During molding of the 1 stage bottle using the polyester resin, haze was not observed with the naked eye. There was no problem in moldability and appearance even in 2 stage bottle molding.

Example 7: Preparation of Polyester Resin 3231 g (19.5 mol) of terephthalic acid, 1098 g (17.7 mol) of ethylene glycol, and 398 g (2.7 mol) of isosorbide were added to a 10 L reactor equipped with a column and a water-cooled condenser. 1.0 g of $GeO_2$ as a catalyst, 1.50 g of phosphoric acid as a stabilizer, 0.020 g of Polysynthrene Blue RLS (Clarient) as a blue toner, and 0.004 g of Solvaperm Red Red (Clarient) as a red toner were used (molar ratio between dicarboxylic acid or its derivative and diol: 1:1.05). Then, nitrogen was injected into the reactor to create a pressurized state in which the pressure of the reactor was higher than the atmospheric pressure by 0.5 kgf/cm² (absolute pressure: 1127.8 mmHg).

Then, the temperature of the reactor was raised to 220° C. for 90 minutes, maintained at 220° C. for 2 hours, and then raised to 255° C. for 2 hours. Thereafter, the mixture in the reactor was observed with the naked eye, and the esterification reaction was carried out while maintaining the temperature of the reactor at 255° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and this pressure state was maintained for 1 hour. Then, the temperature of the reactor was raised to 270° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.70 dl/g.

With respect to the total acid-derived residue contained in the polyester resin thus prepared, the residue derived from terephthalic acid was 100 mol %. With respect to the total diol-derived residue, the residue derived from isosorbide was 12 mol %, the residue derived from ethylene glycol was 86 mol % and the residue derived from diethylene glycol was 2 mol %.

As a result of measuring the physical properties of the polyester resin according to the above-mentioned methods, it was confirmed that Tm in the DSC $1^{st}$ scan was 210° C., Tg ($2^{nd}$ scan) 92° C., Mn 22,000, Mw 68,000, PDI 3.09 and haze 0.8%.

During molding of the 1 stage bottle using the polyester resin, haze was not observed with the naked eye. There was no problem in moldability and appearance even in 2 stage bottle molding.

Comparative Example 1: Preparation of Polyester Resin 3302 g (19.9 mol) of terephthalic acid and 1480 g (23.9 mol) of ethylene glycol were added to a 10 L reactor equipped with a column and a water-cooled condenser. 1.0 g of $GeO_2$ as a catalyst, 1.46 g of phosphoric acid as a stabilizer, 0.012 g of Polysynthrene Blue RLS (Clarient) as a blue toner, and 0.004 g of Solvaperm Red Red (Clarient) as a red toner were used (molar ratio between dicarboxylic acid or its derivative and diol: 1:1.2). Then, nitrogen was injected into the reactor to create a pressurized state in which the pressure of the reactor was higher than the atmospheric pressure by 1.0 kgf/cm² (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and simultaneously the temperature of the reactor was raised to 280° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.60 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 150° C. for 1 hours and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 210° C. at a rate of 40° C./hour and maintained at 210° C. The solid phase polymerization was carried out until the intrinsic viscosity (IV) of the particles in the reactor reached 0.80 dl/g.

With respect to the total acid-derived residue contained in the polyester resin thus prepared, the residue derived from terephthalic acid was 100 mol %. With respect to the total diol-derived residue, the residue derived from ethylene glycol was 96.5 mol % and the residue derived from diethylene glycol was 3.5 mol %.

As a result of measuring the physical properties of the polyester resin according to the above-mentioned methods, it was confirmed that Tm in the DSC $1^{st}$ scan was 250° C., Tg ($2^{nd}$ scan) 70° C., Mn 23,000, Mw 75,000, PDI 3.26 and haze 10.4%.

During molding of the 1 stage bottle using the polyester resin, haze was observed with the naked eye. There was no problem in moldability and appearance even in 2 stage bottle molding.

Comparative Example 2: Preparation of Polyester Resin 3492 g (21.0 mol) of terephthalic acid, 1748 g (28.2 mol) of ethylene glycol, and 184 g (1.3 mol) of isosorbide were added to a 10 L reactor equipped with a column and a water-cooled condenser. 1.0 g of $GeO_2$ as a catalyst, 1.46 g of phosphoric acid as a stabilizer, and 0.7 g of cobalt acetate as a coloring agent were used (molar ratio between dicarboxylic acid or its derivative and diol: 1:1.4). Then, nitrogen was injected into the reactor to create a pressurized state in which the pressure of the reactor was higher than the atmospheric pressure by 1.0 kgf/cm² (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and simultaneously the temperature of the reactor was raised to 280° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.60 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 140° C. for 3 hours and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 205° C. at a rate of 40° C./hour and maintained at 205° C. The solid phase polymerization was carried out until the intrinsic viscosity (IV) of the particles in the reactor reached 0.75 dl/g.

With respect to the total acid-derived residue contained in the polyester resin thus prepared, the residue derived from terephthalic acid was 100 mol %. With respect to the total diol-derived residue, the residue derived from isosorbide was 3 mol %, the residue derived from ethylene glycol was 94 mol % and the residue derived from diethylene glycol was 3 mol %.

As a result of measuring the physical properties of the polyester resin according to the above-mentioned methods, it was confirmed that Tm in the DSC 1I' scan was 240° C., Tg ($2^{nd}$ scan) 82° C., Mn 20,000, Mw 72,000, PDI 3.60 and haze 5.5%.

During molding of the 1 stage bottle using the polyester resin, haze was observed with the naked eye. There was no problem in moldability and appearance even in 2 stage bottle molding.

Comparative Example 3: Preparation of Polyester Resin 3355 g (20.2 mol) of terephthalic acid, 1228 g (19.8 mol) of ethylene glycol, and 207 g (1.4 mol) of isosorbide were added to a 10 L reactor equipped with a column and a water-cooled condenser. 1.0 g of $GeO_2$ as a catalyst, 1.46 g of phosphoric acid as a stabilizer, and 0.7 g of cobalt acetate as a coloring agent were used (molar ratio between dicarboxylic acid or its derivative and diol: 1:1.05). Then, nitrogen was injected into the reactor to create a pressurized state in which the pressure of the reactor was higher than the atmospheric pressure by 1.0 kgf/cm$^2$ (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and simultaneously the temperature of the reactor was raised to 280° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.40 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 150° C. for 1 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 200° C. at a rate of 40° C./hour and maintained at 200° C. The solid phase polymerization was carried out until the intrinsic viscosity (IV) of the particles in the reactor reached 0.75 dl/g.

With respect to the total acid-derived residue contained in the polyester resin thus prepared, the residue derived from terephthalic acid was 100 mol %. With respect to the total diol-derived residue, the residue derived from isosorbide was 6 mol %, the residue derived from ethylene glycol was 92 mol % and the residue derived from diethylene glycol was 2 mol %.

As a result of measuring the physical properties of the polyester resin according to the above-mentioned methods, it was confirmed that Tm in the DSC $1^{st}$ scan was 237° C., Tg ($2^{nd}$ scan) 85° C., Mn 18,000, Mw 75,000, PDI 4.17 and haze 3.50/%.

During molding of the 1 stage bottle using the polyester resin, haze was observed with the naked eye. There was no problem in moldability and appearance even in 2 stage bottle molding.

Comparative Example 4: Preparation of Polyester Resin 2652 g (16.0 mol) of terephthalic acid, 1278 g (20.6 mol) of ethylene glycol, and 257 g (1.8 mol) of isosorbide were added to a 10 L reactor equipped with a column and a water-cooled condenser. 1.0 g of $GeO_2$ as a catalyst, 1.46 g of phosphoric acid as a stabilizer, 0.010 g of Polysynthrene Blue RLS (Clarient) as a blue toner, 0.003 g of Solvaperm Red Red (Clarient) as a red toner, and 1 ppm of polyethylene as a crystallizing agent were used (molar ratio between dicarboxylic acid or its derivative and diol: 1:1.4). Then, nitrogen was injected into the reactor to create a pressurized state in which the pressure of the reactor was higher than the atmospheric pressure by 1.0 kgf/cm² (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 5 Torr (absolute pressure: 5 mmHg) at normal pressure for 30 minutes, and simultaneously the temperature of the reactor was raised to 270° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.50 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 140° C. for 3 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 200° C. at a rate of 40° C./hour and maintained at 200° C. The solid phase polymerization was carried out until the intrinsic viscosity (IV) of the particles in the reactor reached 0.95 dl/g.

With respect to the total acid-derived residue contained in the polyester resin thus prepared, the residue derived from terephthalic acid was 100 mol %. With respect to the total diol-derived residue, the residue derived from isosorbide was 6 mol %, the residue derived from ethylene glycol was 88 mol % and the residue derived from diethylene glycol was 6 mol %.

As a result of measuring the physical properties of the polyester resin according to the above-mentioned methods, it was confirmed that Tm in the DSC $1^{st}$ scan was 230° C., Tg ($2^{nd}$ scan) 82° C., Mn 26,000, Mw 107,000, PDI 4.12 and haze 1.5%.

Comparative Example 5: Preparation of Polyester Resin 3325 g (20.0 mol) of terephthalic acid, 1143 g (18.4 mol) of ethylene glycol, and 1111 g (7.6 mol) of isosorbide were added to a 10 L reactor equipped with a column and a water-cooled condenser. 1.0 g of GeO₂ as a catalyst, 1.50 g of phosphoric acid as a stabilizer, 0.021 g of Polysynthrene Blue RLS (Clarient) as a blue toner, 0.004 g of Solvaperm Red Red (Clarient) as a red toner, and 10 ppm of Iganox 1076 as an antioxidant were used (molar ratio between dicarboxylic acid or its derivative and diol: 1:1.3). Then, nitrogen was injected into the reactor to create a pressurized state in which the pressure of the reactor was higher than the atmospheric pressure by 1.0 kgf/cm² (absolute pressure: 1495.6 mmHg).

Then, the temperature of the reactor was raised to 220° C. for 90 minutes, maintained at 220° C. for 2 hours, and then raised to 255° C. for 2 hours. Thereafter, the mixture in the reactor was observed with the naked eye, and the esterification reaction was carried out while maintaining the temperature of the reactor at 255° C. until the mixture became transparent. During this process, 650 g of by-products were discharged through the column and the condenser. When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

Then, the pressure of the reactor was reduced to 100 Torr (absolute pressure: 100 mmHg) at normal pressure for 10 minutes, and this pressure state was maintained for 1 hour. Then, the temperature of the reactor was raised to 270° C. for 1 hour, and the polycondensation reaction was carried out while maintaining the pressure of the reactor at 1 Torr (absolute pressure: 1 mmHg) or less. In the initial stage of the polycondensation reaction, the stirring speed was set to be quick, but with the proceeding of the polycondensation reaction, the stirring speed could be appropriately controlled when the stirring force was weakened due to an increase in the viscosity of the reactants, or when the temperature of the reactants was raised to the set temperature or more. The polycondensation reaction was carried out until the intrinsic viscosity (IV) of the mixture (melt) in the reactor reached 0.70 dl/g.

With respect to the total acid-derived residue contained in the polyester resin thus prepared, the residue derived from terephthalic acid was 100 mol %. With respect to the total diol-derived residue, the residue derived from isosorbide was 20 mol %, the residue derived from ethylene glycol was 77.5 mol % and the residue derived from diethylene glycol was 2.5 mol %.

As a result of measuring the physical properties of the polyester resin according to the above-mentioned methods, it was confirmed that Tm in the DSC $1^{st}$ scan was not observed, Tg ($2^{nd}$ scan) 95° C., Mn 25,000, Mw 68,000, PDI 2.72 and haze 0.8%.

During molding of the 1 stage bottle using the polyester resin, haze was not observed with the naked eye. There was a problem in moldability and appearance even in 2 stage bottle molding.

Experimental Example: Evaluation of Polyester Resin

The physical properties of the polyester resins prepared in Examples 1 to 7 and Comparative Examples 1 to 5 were evaluated according to the methods described above, and the results are shown in Table 1.

TABLE 1

| | | G/A<br>I/T<br>E/T | ISB residual ratio (%) | Difference between melt IV and solid phase IV | ISB content<br>DEG content | Tg<br>Tm | Mn<br>Mw<br>PDI | Haze | 1 stage bottle molding | 2 stage bottle molding |
|---|---|---|---|---|---|---|---|---|---|---|
| Example | 1 | 1.04<br>0.08<br>0.96 | 75 | 0.15 | 6 mol %<br>3 mol % | 85° C.<br>236° C. | 19,000<br>70,000<br>3.68 | 2.4% | OK | OK |
| | 2 | 1.13<br>(1.03 + 0.1)<br>0.085<br>0.945 | 71 | 0.30 | 6 mol %<br>4 mol % | 85° C.<br>236° C. | 28,000<br>95,000<br>3.39 | 1.2% | OK | OK |
| | 3 | 1.05<br>0.12<br>0.93 | 83 | 0.25 | 10 mol %<br>3.5 mol % | 90° C.<br>220° C. | 25,000<br>83,000<br>3.32 | 1.0% | OK | OK |
| | 4 | 2.050<br>0.220<br>1.830 | 27 | 0.35 | 6 mol %<br>3 mol % | 85° C.<br>236° C. | 27,000<br>103,000<br>3.81 | 1.3% | OK | OK |
| | 5 | .05<br>0.080<br>0.97 | 75 | 0.30 | 6 mol %<br>3.5 mol % | 85° C.<br>236° C. | 27,000<br>87,000<br>3.22 | 1.2% | OK | OK |
| | 6 | 1.04<br>0.14<br>0.9 | 86 | 0.20 | 12 mol %<br>5 mol % | 90° C.<br>210° C. | 22,000<br>68,000<br>3.09 | 0.8% | OK | OK |
| | 7 | 1.05<br>0.14<br>0.91 | 86 | — | 12 mol %<br>2 mol % | 92° C.<br>212° C. | 23,000<br>65,000<br>2.83 | 0.7% | OK | OK |
| Comparative Example | 1 | 1.200<br>0.000<br>1.200 | — | 0.20 | 0 mol %<br>3.5 mol % | 70° C.<br>250° C. | 23,000<br>75,000<br>3.26 | 10.4% | Haze | OK |
| | 2 | 1.400<br>0.060<br>1.340 | 50 | 0.15 | 3 mol %<br>3 mol % | 82° C.<br>240° C. | 20,000<br>72,000<br>3.60 | 5.5% | Haze | OK |
| | 3 | 1.050<br>0.070<br>0.980 | 86 | 0.35 | 6 mol %<br>2 mol % | 85° C.<br>237° C. | 18,000<br>75,000<br>4.17 | 3.5% | Haze | OK |
| | 4 | 1.400<br>0.110<br>1.290 | 55 | 0.45 | 6 mol %<br>6 mol % | 82° C.<br>230° C. | 26,000<br>107,000<br>4.12 | 1.5% | Progressing the molding X | |
| | 5 | 1.300<br>0.380<br>0.920 | 54 | — | 20 mol %<br>2.5 mol % | 95° C.<br>— | 25,000<br>68,000<br>2.72 | 0.8% | OK | NG |

G/A: Molar ratio of diol to dicarboxylic acid or its derivative (mole number of the diol/mole number of the dicarboxylic acid or its derivative; when the diol is added/mixed in a plurality of steps, it is separately described in the form of "initial mixing molar ratio of diol + additional addition molar ratio" in parentheses).
I/T: Molar ratio of isosorbide to dicarboxylic acid or its derivative (mole number of isosorbide/mole number of dicarboxylic acid or derivative thereof)
E/T: Molar ratio of ethylene glycol to dicarboxylic acid or its derivative (mole number of ethylene glycol/mole number of dicarboxylic acid or derivative thereof)
ISB residual ratio: Molar ratio of isosorbide introduced into the polyester resin relative to the total isosorbide used for the preparation of the polyester resin ({mole number of diol moiety derived from isosorbide/mole number of acid moiety derived from dicarboxylic acid or derivative thereof}/{mole number of isosorbide/mole number of dicarboxylic acid or derivative thereof} * 100)
Differences between melt IV and solid phase IV: Difference between the intrinsic viscosity of resin before polycondensation reaction completion and solid phase polymerization (molt IV) and the intrinsic viscosity of the resin after solid phase polymerization (solid phase IV)
ISB content: The molar ratio of the residue derived from isosorbide relative to the residue derived from total diols included in the polyester resin
DEG content: The molar ratio of the residue derived from diethylene glycol relative to the residue derived from total diols included in the polyester resin Referring to Table 1, in the 1 stage bottle molding process, blowing is performed by using the latent heat of the molded preform. However, if the diol moiety derived from isosorbide is not contained as in the polyester resin of Comparative Example 1, it is confirmed that haze is generated due to intramolecular crystallization at a temperature suitable for progressing the blowing. If the molded preform is sufficiently cooled in order to prevent the generation of haze, a problem arises that the subsequent blowing becomes impossible.

In addition, it is confirmed that the polyester resin of Comparative Example 2 contains a too small amount of the diol portion derived from isosorbide and thus haze is generated after molding due to high regularity of the polymer chain.

On the other hand, referring to Example 1, Example 2, and Comparative Example 3, it is confirmed that although the polyester resin includes diol moieties derived from the same content of isosorbide, haze is generated when the content of diol moieties derived from diethylene glycol relative to the total diol moiety is less than 2.5 mole % and when the molecular weight distribution is more than 4. In particular, it is confirmed from Examples 1 and 2 and Comparative Example 3 that the intrinsic viscosity of the resin before solid phase polymerization (melt IV) should be at least 0.45 dl/g, whereby in order not to cause haze, an appropriate amount of a diol moiety derived from diethylene glycol can be included and an appropriate molecular weight distribution can be exhibited.

On the other hand, referring to Comparative Example 4, it is confirmed that although the polyester resin contains an appropriate amount of a diol moiety derived from isosorbide, the heat resistance is lowered if it contains a large amount of the diol moiety derived from diethylene glycol. Considering that Tg required for applications such as a hot fill jar is at least about 85° C., it can be seen that the polyester resin produced from Comparative Example 4 is unsuitable for applications such as a hot fill jar.

On the other hand, referring to Example 6, Example 7, and Comparative Example 5, it can be confirmed that there is a limit in the monomer composition for providing a polyester resin having a melting point during the first scan through DSC. In the case of the polyester resin of Comparative Example 5 in which the diol moiety derived from isosorbide is 20 mol % based on the entire diol moiety derived from the diol, Tm peak is not observed during the first scan through DSC, whereby orientation due to drawing of molecules does not occur. Therefore, it is confirmed that in the case of the polyester resin of Comparative Example 5, a two stage bottle molding in which a draw ratio of the preform and the bottle is large as described above is impossible.

Thereby, it is confirmed that the polyester resin is prepared under specific process conditions, such as the initial input/mixing ratio of the diol being controlled in an appropriate range, the diol moiety derived from isosorbide and the diol moiety derived from diethylene glycol in the polymer chain must satisfy a specific range to have a glass transition temperature above a certain level, thereby exhibiting high heat resistance and excellent mechanical properties, and showing high transparency despite its thick wall thickness. Further, it is confirmed that by adjusting the intrinsic viscosity of the resin before the solid phase polymerization reaction and adjusting the molecular weight distribution of the polyester resin to be narrow, an appropriate crystallization speed can be achieved, thereby providing a thick resin molded article without causing haze.

It can be confirmed that the resin molded articles prepared from the polyester resins of all of the above Examples exhibit very low haze of less than 3% despite their thick wall thickness, have a melting point during the first scan through DSC and have a high glass transition temperature, so that both 1 and 2 stage bottle molding are possible and it is effective to be applied to various applications such as bottle.

What is claimed is:

1. A polyester resin polymerized with a dicarboxylic acid including terephthalic acid or a derivative thereof and a diol including isosorbide and ethylene glycol, thereby having an alternating structure of an acid moiety derived from the dicarboxylic acid or a derivative thereof and a diol moiety derived from the diol,
    wherein the polyester resin includes 6 mol % to 12 mol % of a diol moiety derived from isosorbide, 2 mol % to 5 mol % of a diol moiety derived from diethylene glycol, and remainder of a diol moiety derived from ethylene glycol based on the total diol moieties derived from the diol,
    wherein the polyester resin is prepared by a polycondensation reaction and a solid phase polymerization such that an intrinsic viscosity after the solid phase polymerization, which is measured at 35° C. after dissolving the polymer in orthochlorophenol at a concentration of 1.2 g/dl at 150° C. for 15 minutes, reaches a value of 0.25 dl/g to 0.40 dl/g higher than an intrinsic viscosity of the resin obtained by the polycondensation reaction,
    wherein the intrinsic viscosity of the resin obtained by the polycondensation reaction is 0.60 dl/g to 0.75 dl/g, and the intrinsic viscosity after the solid phase polymerization is 0.85 dl/g to 1.0 dl/g,
    wherein a melting point exists during the first scan through a differential scanning calorimetry (DSC),
    wherein a haze is 1.5% or less as measured according to ASTM D1003-97 for a specimen having a thickness of 6 mm obtained from the polyester resin, and
    wherein the polyester resin has a weight average molecular weight of 70,000 g/mol to 150,000 g/mol.

2. The polyester resin of claim 1, wherein the dicarboxylic acid or a derivative thereof is a dicarboxylic acid or a derivative thereof other than terephthalic acid or a derivative thereof, which includes at least one selected from the group consisting of an aromatic dicarboxylic acid having 8 to 14 carbon atoms or a derivative thereof and an aliphatic dicarboxylic acid having 4 to 12 carbon atoms or a derivative thereof in an amount of 0 to 50 mol % based on the total dicarboxylic acids or derivatives thereof.

3. The polyester resin of claim 1, wherein the polyester resin has a number average molecular weight of 15,000 to 50,000 g/mol.

4. The polyester resin of claim 1, wherein the polyester resin has a molecular weight distribution of 2.5 to 4.0.

5. The polyester resin of claim 1, wherein the polyester resin has a melting point of 200° C. to 250° C. as measured during the first scan through a differential scanning calorimetry (DSC).

6. The polyester resin of claim 1, wherein the polyester resin has a glass transition temperature of 85° C. or more.

7. The polyester resin of claim 1, wherein the polyester resin is used for a bottle, a hot fill jar, a high-pressure vessel, a sheet, a drawn film or a fiber.

8. A resin molded article prepared from the polyester resin according to claim 1.

9. The resin molded article of claim 8, having a wall thickness of 4.5 mm or more.

* * * * *